US012678983B2

(12) United States Patent
Staab et al.

(10) Patent No.: US 12,678,983 B2
(45) Date of Patent: Jul. 14, 2026

(54) ROBOTIC SYSTEM COMPRISING AN ENVIRONMENT SENSOR

(71) Applicant: ABB Schweiz AG, Baden (CH)

(72) Inventors: Harald Staab, Neckargemünd (DE); Björn Matthias, Bad Schönborn (DE); Nima Enayati, Mannheim (DE); Fan Dai, Zwingenberg (DE)

(73) Assignee: ABB Schweiz AG, Baden (CH)

( * ) Notice: Subject to any disclaimer, the term of this patent is extended or adjusted under 35 U.S.C. 154(b) by 67 days.

(21) Appl. No.: 18/635,146

(22) Filed: Apr. 15, 2024

(65) Prior Publication Data

US 2024/0253254 A1 Aug. 1, 2024

Related U.S. Application Data

(63) Continuation of application No. PCT/EP2021/079008, filed on Oct. 19, 2021.

(51) Int. Cl.
| | |
|---|---|
| *B25J 19/02* | (2006.01) |
| *B25J 9/16* | (2006.01) |
| *G06V 40/10* | (2022.01) |

(52) U.S. Cl.
CPC ........... *B25J 19/023* (2013.01); *B25J 9/1674* (2013.01); *B25J 9/1697* (2013.01); *G06V 40/10* (2022.01)

(58) Field of Classification Search
CPC ...... B25J 19/023; B25J 9/1674; B25J 9/1697; B25J 19/06; B25J 19/021; G06V 40/10
See application file for complete search history.

(56) References Cited

U.S. PATENT DOCUMENTS

| | | | |
|---|---|---|---|
| 8,879,825 B2 | 11/2014 | England et al. | |
| 9,310,608 B2 | 4/2016 | Weiss et al. | |
| 11,067,998 B2 * | 7/2021 | Lee ............................ | B25J 9/16 |
| 11,097,418 B2 | 8/2021 | Nagarajan et al. | |
| 2006/0041333 A1 | 2/2006 | Anezaki | |
| 2006/0182314 A1 * | 8/2006 | England .................. | G06T 11/10 |
| | | | 382/106 |
| 2013/0158947 A1 | 6/2013 | Suzuki | |
| 2018/0210064 A1 * | 7/2018 | Send ......................... | G01C 3/32 |

(Continued)

FOREIGN PATENT DOCUMENTS

| | | | |
|---|---|---|---|
| CN | 108027239 A | 5/2018 | |
| CN | 111241946 B * | 4/2024 | ............. G06V 20/20 |

(Continued)

OTHER PUBLICATIONS

Machine translation of CN-111241946-B.*

(Continued)

*Primary Examiner* — Robert T Nguyen
(74) *Attorney, Agent, or Firm* — Whitmyer IP Group LLC

(57) ABSTRACT

A robotic system includes a moveable component, a controller, and an environment sensor for monitoring at least a region of the operating range, the environment sensor comprising a camera configured to deliver a 2D image of a field of view of the camera and a TOF device for measuring a distance between the environment sensor and an object in the field of view based on propagation time of a polling signal from the TOF device to the object and back; wherein an optical element for redirecting the field of view to the region is provided in a light path between the region and the environment sensor.

15 Claims, 3 Drawing Sheets

(56) References Cited

U.S. PATENT DOCUMENTS

| | | | |
|---|---|---|---|
| 2019/0146504 A1 | 5/2019 | Lee et al. | |
| 2019/0248003 A1* | 8/2019 | Nagarajan | B25J 9/163 |
| 2019/0368865 A1 | 12/2019 | Corkum et al. | |
| 2021/0173200 A1 | 6/2021 | Kamakura et al. | |
| 2023/0097932 A1* | 3/2023 | Chen | B25J 9/1692 |
| | | | 700/254 |

FOREIGN PATENT DOCUMENTS

| | | | | |
|---|---|---|---|---|
| JP | 2019036924 A * | 3/2019 | | H04N 7/18 |
| SU | 682330 A1 | 8/1979 | | |
| WO | WO 2011/146259 A2 | 11/2011 | | |
| WO | WO-2022198638 A1 * | 9/2022 | | G01S 7/486 |

OTHER PUBLICATIONS

Machine translation of JP-2019036924-A.*
Machine translation of WO-2022198638-A1.*
Staab et al., "Camera-Mirror System on a Remotely Operated Vehicle or Machine," Published Technical Disclosure, downloaded from the Internet on Apr. 3, 2024, at https://new.abb.com/docs/librariesprovider15/ip/remotecontrolawareness.pdf?sfvrsn=9, 6 pp. (Feb. 20, 2015).
European Patent Office, International Search Report in International Patent Application No. PCT/EP2021/079008, 4 pp. (Jul. 20, 2022).
European Patent Office, Written Opinion in International Patent Application No. PCT/EP2021/079008, 7 pp. (Jul. 20, 2022).
European Patent Office, Office Action in European Patent Application No. 21799206.4, 5 pp. (Sep. 22, 2025).

* cited by examiner

ROBOTIC SYSTEM COMPRISING AN ENVIRONMENT SENSOR

CROSS-REFERENCE TO RELATED APPLICATIONS

The instant application claims priority to International Patent Application No. PCT/EP2021/079008, filed Oct. 19, 2021, which is incorporated herein in its entirety by reference.

FIELD OF THE DISCLOSURE

The present disclosure generally relates to robotic systems and, more particularly, to a robotic system comprising a component that is moveable within an operating area.

BACKGROUND OF THE INVENTION

The most straightforward choice for an environment sensor for a robot system is an electronic camera. However, these provide information relating to the position of objects in the environment only in two dimensions perpendicular to a line of sight of the camera, but not along the line of sight itself. Therefore, U.S. Pat. No. 9,310,608 B2 proposes a robotic system in which information relating to the distance of objects in the vicinity of a robotic vehicle is obtained using laser scanners. Using a first laser scanner scanning a horizontal plane, it is possible to distinguish whether an object is in a warning zone or in a safety zone, closer to the scanner. Since objects outside the horizontal plane aren't detected by the first laser scanner, a second laser scanner is provided whose beam, in the course of one scan, is successively deflected by several mirrors, each mirror thus defining an auxiliary detection plane which is inclined with respect to the horizontal plane.

Recently, 3D depth cameras have become popular in applications such as mobile phones. They combine a conventional electronic camera having a two-dimensional array of light sensors with a time-of-flight device which emits a polling signal to be reflected by an object in the field of view of the camera, and estimates the distance to said object based on the time the polling signal takes to reach the object and return to the device. Such 3D depth cameras have a limited field of view that is suitable for photography, but may not wide enough to monitor the entire operating range of a movable component in a robotic system.

BRIEF SUMMARY OF THE INVENTION

The present disclosure describes a robotic system comprising a component which is movable within an operating range associated to it, a controller for controlling movements of the movable component within said operating range, and an environment sensor for monitoring at least a region of the operating range in order to enable the controller to adapt the movement of the component to sensing results relating to e.g. presence of obstacles or of a person within said region, the position of the component with respect to a workpiece etc.

In one embodiment, a robotic system includes an environment sensor such as a 3D depth camera, which can be used for monitoring an operating range of a movable component even when the field of view of the environment sensor doesn't a priori match the operating range. The robotic system comprises a component that is movable within an operating range, a controller for controlling movements of the movable component, and an environment sensor for monitoring at least a region of the operating range, the environment sensor comprising a camera adapted to deliver a 2D image of a field of view of the camera, and a TOF device for measuring a distance between the environment sensor and an object in said field of view based on propagation time of a polling signal from the TOF device to the object and back, in which an optical element is provided in a light path between the region and the environment sensor for redirecting the field of view to said region.

According to a first aspect, the movable component is a robotic arm, which is movable with respect to a base. In that case the environment sensor can be provided in said base, so that it will remain stationary while the robotic arm moves. Where the base comprises an upright post supporting the robotic arm, the mirror is preferably located between the environment sensor and the post. In this way, a single environment sensor can monitor a large portion of the immediate vicinity of the post.

According to a second embodiment, the movable component is an AGV. In that case the environment sensor is preferably provided in said AGV, so as to move along with it. The optical element preferably comprises a mirror. It might also comprise a lens, but compared to the lens the mirror has two advantages, one being that since the path of the polling signal from the TOF device to a reflecting object and back via the mirror may pass through air alone, the time of flight is directly proportional to the length of the path, whereas in case of a lens, the thickness of the latter must be taken into account when converting a measured time of flight into a distance. The other is that mirrors having a high reflectivity also in wide ranges outside the visible spectrum of light are readily available, so that the polling signal can have a wavelength which is invisible to the human eye and to the camera whereas such a polling signal may be absorbed by many common lens materials that block certain UV or IR wavelength ranges.

In order to adapt the mirror to the operating range of the movable component, the mirror may be pivotably mounted. The mount of the mirror may allow for manual adjustment; preferably an actuator for pivoting the mirror is operatively connected to the controller; thereby enabling the controller to direct the field of view of the camera to any region of the operating range from which information is needed. The region that can be monitored at a time, with the mirror in a given orientation, may be smaller than the operating range. Nevertheless, by pivoting the mirror, the entire operating range can be monitored in time multiplex.

BRIEF DESCRIPTION OF THE SEVERAL VIEWS OF THE DRAWING(S)

Further features and advantages of the invention will become apparent from the subsequent description of embodiments, referring to the appended drawings.

DETAILED DESCRIPTION OF THE INVENTION

Figure 1:
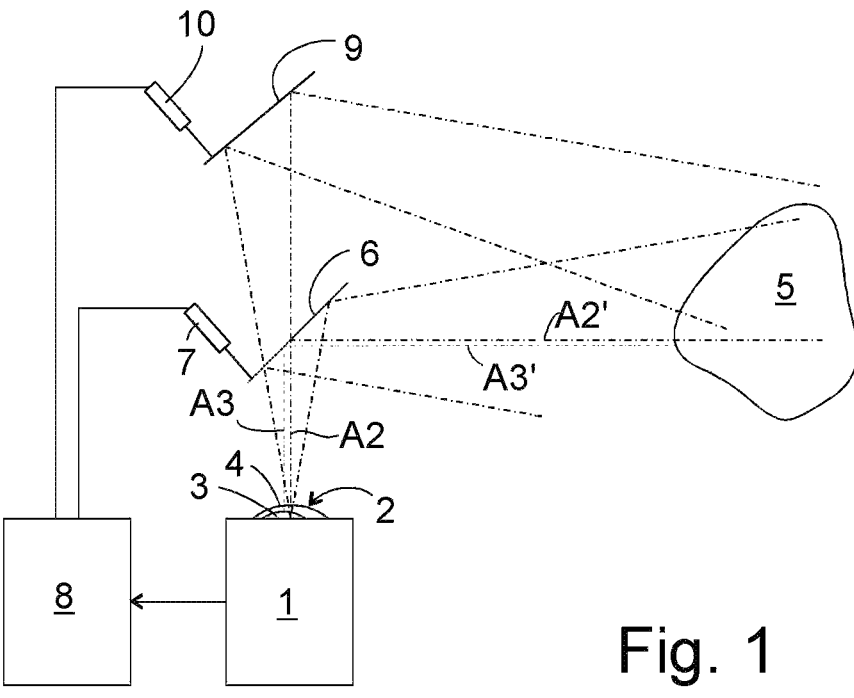
FIG. 1 is a block diagram of an environment sensor and an optical element associated to it according to a first embodiment of the disclosure.

In the setup of FIG. 1, an environment sensor 1, namely a 3D depth camera, comprises an electronic camera 2 and a TOF (time of flight) device 3. The camera 2 is quite conventional in that it comprises a front lens 4 and a sensor chip having a two-dimensional array of photosensitive elements onto which the front lens 4 images incoming light from a scenery 5, for instance the operating range of a robotic arm. The TOF device 3, also known per se, comprises a radiation source emitting infrared radiation centered on an optical axis A3 closely adjacent to an optical axis A2 of camera 2, and a receiver adapted to detect infrared radiation from the source which has been scattered back by an object of the scenery 5, and to derive from the backscattered radiation a distance between the environment sensor 1 and the object.

Reflection at a mirror 6 transforms optical axes A2 and A3 into axes A2' and A3', respectively. The mirror 6 is pivotably mounted, so that the region of the scenery 5 which is actually imaged onto the sensor chip is variable according to the orientation of the mirror 6. Here, the orientation of the mirror 6 is controlled by at least one actuator 7 which, in turn, receives commands from a controller 8. The controller 8 may set the mirror 6 to various orientations in turn, so as to monitor, step by step, different portions of the scenery 5 if the latter is too large to fit into the field of view of the camera 2.

The mirror 6 may fill the entire field of view of the camera 2 or only part of it, as illustrated in FIG. 1 by part of mirror 6 being represented by a dotted line. The part of the field of view that is not filled by mirror 5 can be used for other monitoring purposes. In the example of FIG. 1, this part is occupied by a second mirror 9 which allows to view the scenery 5 from another perspective than by mirror 6, thus minimizing the risk that a significant detail in the scenery 5 goes unnoticed because it is hidden from the view provided by mirror 6 by some other object. Mirror 9 may also have an actuator 10 associated to it which enables controller 8 to control its orientation.

Figure 2:
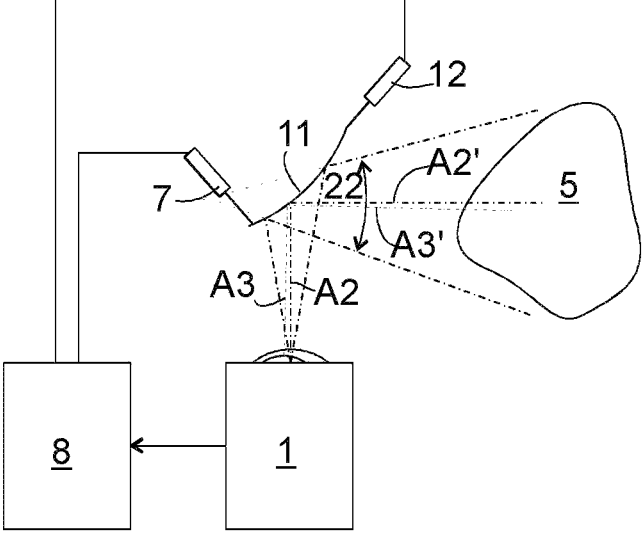
FIG. 2 is a block diagram of an environment sensor and an optical element associated to it according to a second embodiment of the disclosure.

In the embodiment of FIG. 2, a convex mirror 11 is provided between the environment sensor 1 and the scenery 5. The convex mirror 11 widens the field of view of the camera 3, so that details of the scenery 5 remote from axis A2' are reliably detected even if close to the mirror 11. Here, too, an actuator 7 may be provided by which the controller 8 can adjust the orientation of the mirror 11, and, therewith, the width of the field of view.

Another actuator 12 can be used to adjust the curvature of the mirror 11 in at least one dimension, e.g. by compressing or extending it in a lateral direction. Alternatively, an actuator might be used for selectively placing mirrors having different degrees of cylindrical or spherical curvature across axes A2, A3 and thus widening or narrowing the field of view of the camera 2 by discrete steps.

Figure 3:
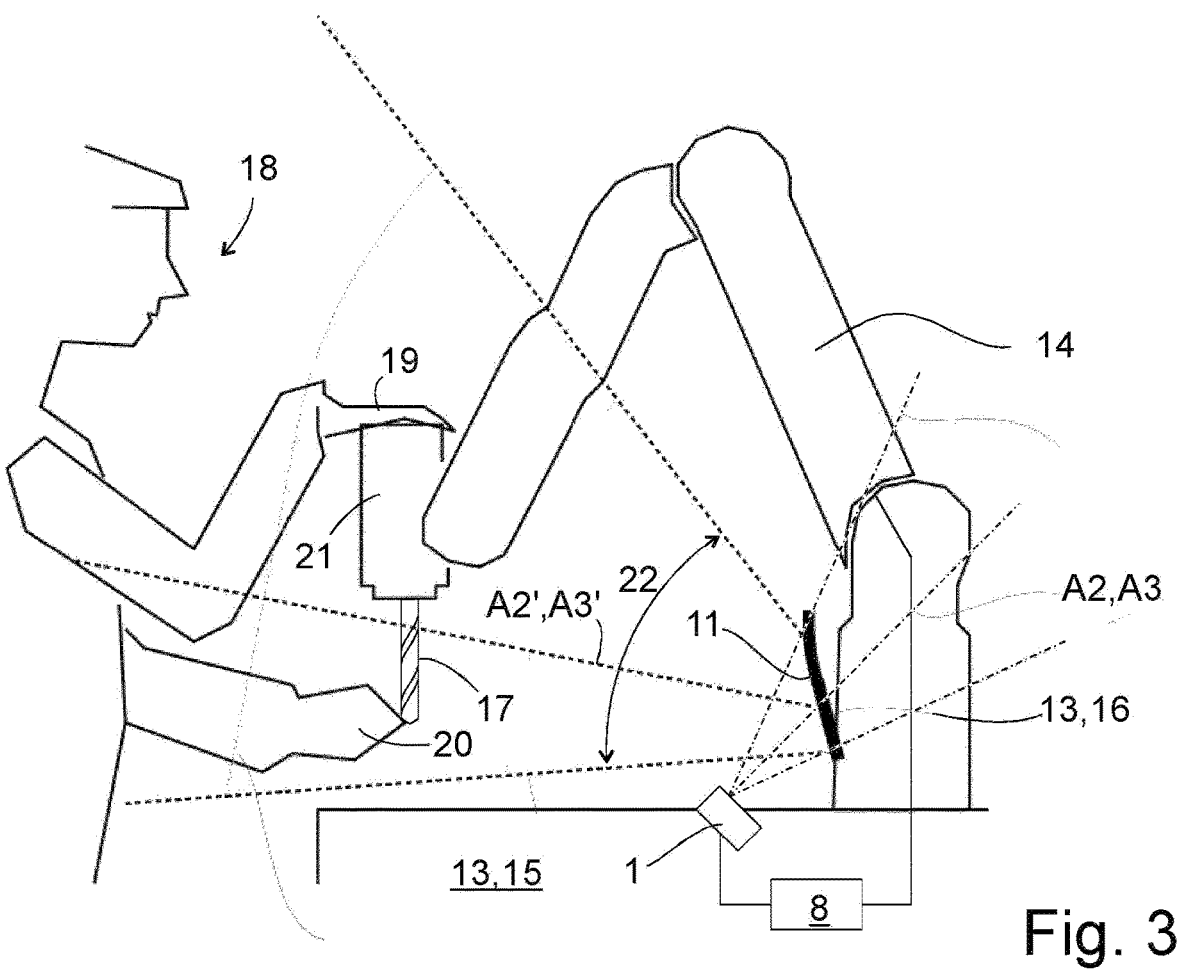
FIG. 3 is a schematic view of a first collaborative robot system in accordance with the disclosure.

FIG. 3 illustrates a robotic system in which a base 13 which supports an articulated robotic arm 14 is formed by a tabletop 15 and an upright post 16 on the tabletop. The environment sensor 1 is inserted in the tabletop 15 with its optical axes 2A, 3A upwardly inclined towards the convex mirror 11 mounted on the post 16. Axes 2A', 3A' redirected by mirror 11 extend towards a region above the tabletop 15 where a workpiece to be processed by an end effector 17 of the robotic arm 14 would be located, and a region where a person 18 handling the system may be standing.

Spherical curvature of the mirror 11 widens the field of view of the camera 2 of sensor 1 both horizontally and vertically, enabling the camera 2 to see the end effector 17 wherever it is likely to be placed while processing a workpiece. Thus, it can also see the person's hands 19, 20 when these approach the end effector 17, enabling the controller 8 to determine positions or identify gestures of the hands and to adapt to these. For example, in the situation shown in FIG. 3, the controller 8 might recognize the person's gesture of placing one hand 19 on a distal portion 21 of arm 14, and based on this recognition, switch into a lead through mode in which it will allow the person 18 to displace the distal portion 21, and will record the displacement so as to reproduce it later, when the person's hand 19 is removed from the distal portion 21, and the controller 8 has reverted to a normal working mode.

Further, the controller 8 might recognize the hand 20 coming critically close to the end effector 17, and might cause an emergency stop of the end effector 17 or of the complete robotic arm 14 in order to prevent the hand 20 from being injured from a contact with the end effector 17.

Figure 4:
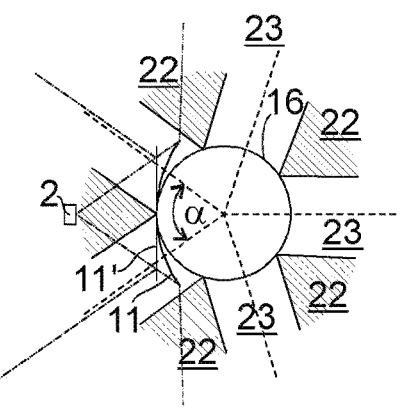
FIG. 4 is a schematic cross section of a post supporting a robotic arm in the first collaborative robot system in accordance with the disclosure.

For ensuring the safety of persons working in the vicinity of the robotic arm 14, it is crucial that no person approaching the robotic arm should go undetected, no matter from what direction. 3D depth cameras are available in which the camera has an angle of view of 70° horizontally x 55° vertically. So, fields of view 22 of five cameras would add up to 350°, i.e. almost a complete circle, but since the cameras can only be installed at a positive distance from the center of the post 16, there would still be gaps 23 between their fields of view 22 where no detection is possible, as shown in FIG. 4. In contrast, when a mirror 11' is mounted on or near the post 16, and the camera 2 is installed facing the mirror 11' and the post 16, the distance of the camera 2 from the mirror 11' can easily be made long enough for the field of view of the camera 2, delimited by dash-dot lines, to be wider on the mirror 11' than what would correspond to a 72° sector a centered on the center of the post 16. So, even when the mirror 11' is flat, five cameras having an angle of view of 70° (or even less cameras, if placed at a larger distance from the post) allow for a complete coverage of the surroundings of the post 16. When the mirror has a concave curvature, each camera can cover a still wider angle of view: In the example shown in FIG. 4, the curvature of mirror 11 spans an angle of approx. 60° and thus extends the angle of view of camera 2 to slightly above 180°, so that two cameras would be sufficient for monitoring the complete surroundings of the post 16.

As mentioned above with respect to FIG. 2, the curvature of mirror 11 can be adjusted by providing an actuator which bends the mirror to a higher or lesser degree. Thus, in the system of FIGS. 3 and 4, the horizontal dimension of the field of view of camera 2 can be adjusted by bending mirror 11, while leaving its vertical dimension substantially unchanged. This would enable the robotic system to operate in two different modes: One where the mirror 11 is plane, and one where it is convex. In the flat mirror mode, the mirror has no effect on the resolution of images obtained by the camera, so that when the camera is safety certified for collaborative robot applications, it can be used in the flat mirror mode to monitor a region of the surroundings of the robotic arm 14 that is determined by the orientation of the mirror 11 for the presence of persons and to trigger a safety measure, such as imposing a speed limit or shutting down operation of the robotic arm 14, when a person is detected in this region. In the convex mirror mode, the camera 2 may be used for scanning for the presence of persons in a wider region than in the flat mirror mode and at lesser resolution which as such may not meet certification standards. Typically, the system can be in the convex mirror mode by default, so as to detect persons approaching the robotic arm from any direction, and can switch into flat mirror mode when a person has been detected, with the controller 8 adjusting the mirror 11 to direct the field of view of the camera 2 to the person detected; thereby monitoring the person with improved resolution. Thus, while the person is still far away from the robot, and there is no immediate possibility of contact between the two, the system can detect that a person is present and where, whereas when the person is close enough for a contact to become possible, it can monitor the person with the degree of detail that is sufficient to avoid any risk of injury and is necessary for a safety certification.

Figure 5:
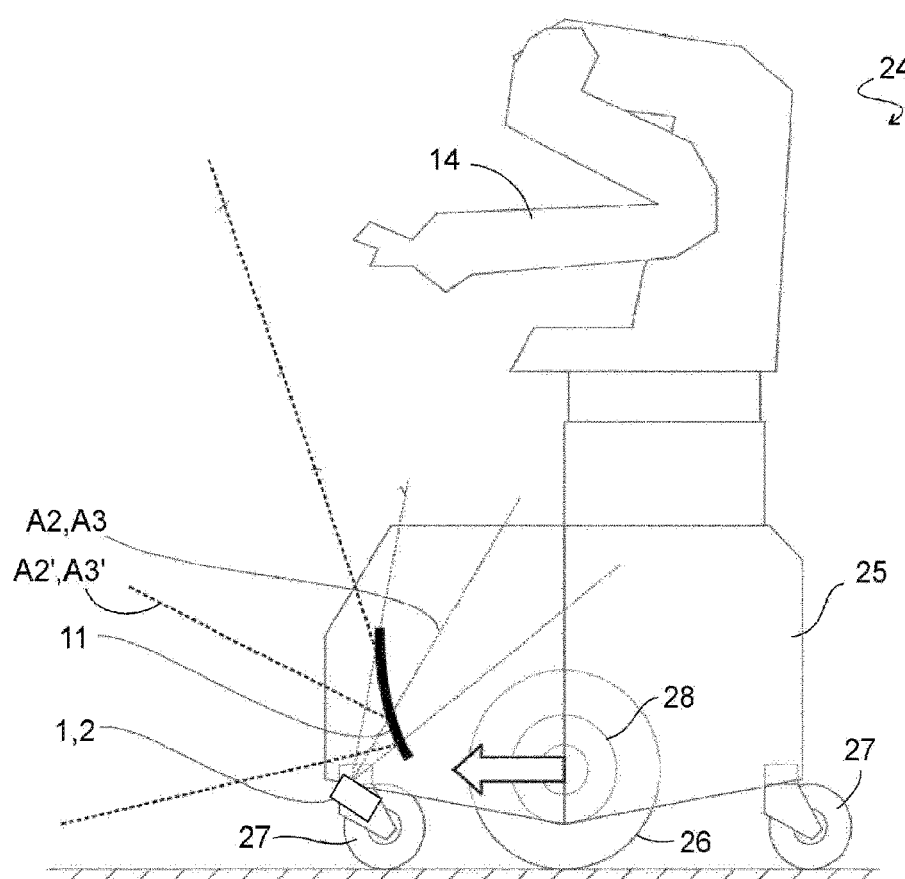
FIG. 5 is a schematic view of a second collaborative robot system in accordance with the disclosure.
Figure 6:
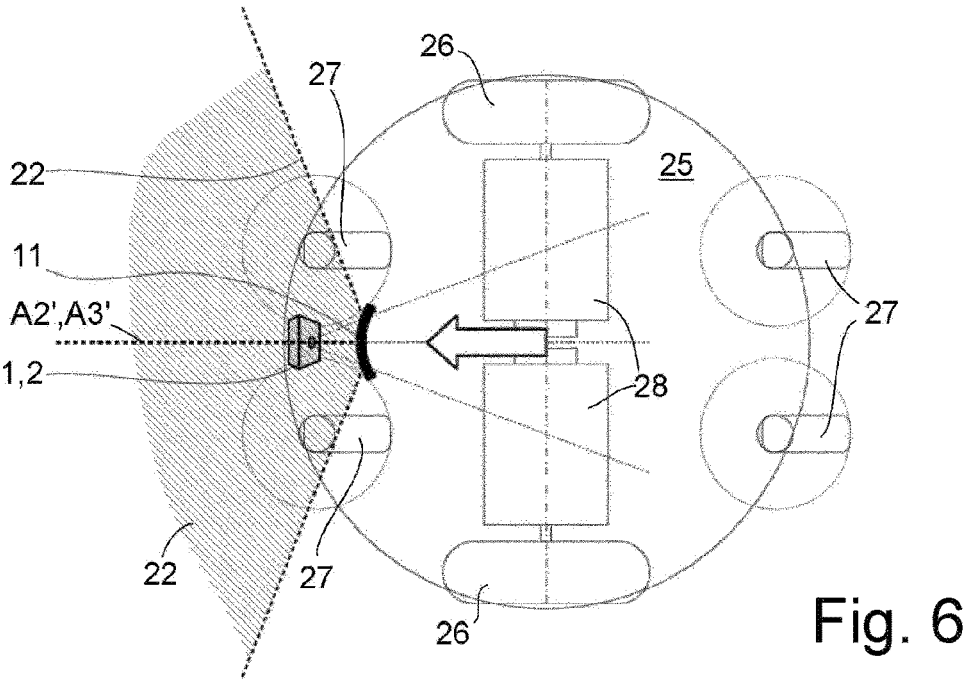
FIG. 6 is a schematic cross section of an AGV of the second collaborative robot system in accordance with the disclosure.

FIGS. 5 and 6 illustrate another collaborative robot system according to the present invention. As a movable component, the system comprises an AGV (autonomous guided vehicle) 24. In the example of FIG. 5, the AGV 24 serves as a mobile base for a robotic arm 14, but it might be used for any other purpose such as carrying freight or passengers instead. In order to facilitate maneuvering in a crammed environment, the AGV 24 has a cylindrical base 25 with two driven wheels 26 aligned on an axis extending radially through the center of the cylindrical base 25, and swingable casters 27 at front and rear sides of the base 25. Each driven wheel 26 has a dedicated motor 28 associated to it. For steering through a curve, motors 28 will drive their respective wheels 26 at different speeds; rotating the wheels in opposite directions enables the AGV to turn on the spot. Since the motors 28 occupy a significant part of the space available in the base 25, a camera 2 for monitoring a path ahead of the AGV 24 will have to be installed in front of the motors 28. The field of view of the camera 2 should cover an angle close to 180° in front of the AGV, in order to be able to detect persons who are approaching the path ahead of the AGV 24 and might bump into it. In order to achieve such a wide field of view, a concave mirror 11 is provided at the front side of the base 25, facing forward, and the environment sensor 1 is installed at the bottom of the base 25, with the optical axes 2A, 3A of its camera and TOF device facing up- and rearwards, towards mirror 11, and the axes 2', 3' reflected by mirror 11 extending in the forward direction.

The width of the field of view covered by environment sensor 1 in front of the AGV 24 should be sufficient to detect any person who is heading towards the path in front of the AGV 24 and might reach a crossing point of the path roughly at the same time as the AGV 24. Thus, while the AGV 24 is at rest, the field of view should cover an angle close to 180°. The faster the AGV 24 goes, the smaller the width, denoted by angle $\beta$ in FIG. 6, can be made, in order to exclude from detection persons who are so far away from the path along which the AGV plans to move that they cannot possibly reach a point crossing the path before the AGV does. As described above, the width of the field of view can be adjusted by a controller of the AGV controlling the curvature of the mirror 11 as a function of speed.

Alternatively, the field of view of the camera can be adapted by the optical element having a finite focal length. Depending on whether the focal length is positive or negative, the optical element can make the field of view narrower or wider. So, if the field of view of the camera as such is too narrow to cover the complete operating range, by providing an optical element having a negative focal length, it can be widened as necessary to cover the operating range. When the optical element is displaceable between a position in the light path between the region and the environment sensor and a position offset from the light path, the field of view can be varied, preferably between covering the entire operating range and covering just a detail of interest therein.

Alternatively, the field of view may be varied by the optical element having a variable focal length, at least in one dimension, and by an actuator for varying the focal length between at least one wide field of view state and one narrow field of view state being operatively connected to the controller. Zoom lenses that have a variable focal length are common in photography and can be used in the robotic system of the present invention, too. Mirrors having a variable curvature in one dimension are particularly easy to manufacture and control.

When the movable component is a robotic arm, the controller may be adapted to control the field of view in the narrow field of view state to comprise an end effector of the robotic arm. Thus, while in the wide field of view state, the camera may be monitoring the entire operating range, in order to detect persons or objects that might block an intended path of the robot, in the narrow field of view state, the end effector may be monitored with high resolution, and can therefore be controlled precisely.

When the movable component is an AGV, the controller is preferably adapted to set the wide field of view state when propagation speed of the AGV is low and to set the narrow wide field of view state when propagation speed of the AGV is high. In the first case the wide field of view ensures that any person or object which is near enough to possibly collide with the AGV is detected, so that the controller can plan a path for the AGV to follow where a collision is avoided. In the latter case, although a person or object that might collide is still far away from the AGV, it can be detected reliably and can be observed with the precision necessary to enable the controller to avoid a collision.

Further, where the controller is adapted to detect a person in an image from the camera in the wide field of view state, it may also be adapted, when a person is detected, to control the optical element to enter the narrow field of view state with the field of view at least partially covering the person. On the one hand, the overall movement of the person can thus be monitored precisely, and changes in the person's speed and direction of movement can be taken account of for controlling the movement of the movable component with minimum delay; on the other hand, closely monitoring the person facilitates the recognition of predefined gestures by the person and taking account of these in controlling the movable component.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

REFERENCE NUMERALS 1 environment sensor
2 camera
3 TOF device
4 front lens
5 scenery
6 mirror
7 actuator
8 controller
9 mirror
10 actuator
11 mirror
12 actuator
13 base
14 robotic arm
tabletop
16 post
17 end effector
18 person
19 hand
hand
21 distal portion
22 field of view
23 gap
24 AGV
25 base
26 wheel
27 caster
28 motor

What is claimed is:

1. A robotic system, comprising:
a component that is movable within an operating range;
a controller configured to control movements of the movable component; and
an environment sensor configured to monitor at least a region of the operating range;
wherein the environment sensor comprises:
a camera configured to capture and provide a 2D image of a field of view of the camera, and
a time of flight (TOF) device for measuring a distance between the environment sensor and an object in the field of view based on propagation time of a polling signal from the TOF device to the object and back;
wherein an optical element for redirecting the field of view to the region is disposed in a light path between the region and the environment sensor,
wherein the movable component is a robotic arm that is movable with respect to a base, and the base comprises an upright post supporting the robotic arm, wherein the optical element is a mirror, and wherein the mirror is disposed between the environment sensor and the post.

2. The robotic system of claim 1, wherein the environment sensor is disposed on the base.

3. The robotic system of claim 1, wherein the mirror is pivotably mounted and moveable by an actuator.

4. The robotic system of claim 3, wherein the actuator for pivoting the mirror is operatively connected to the controller.

5. The robotic system of claim 1, wherein in at least one dimension the optical element has a variable curvature and/or focal length, and an actuator for varying the curvature and/or focal length between at least one wide field of view state and one narrow field of view state is operatively connected to the controller.

6. A robotic system, comprising:
a component that is movable within an operating range;
a controller configured to control movements of the movable component; and
an environment sensor configured to monitor at least a region of the operating range;
wherein the environment sensor comprises:
a camera configured to capture and provide a 2D image of a field of view of the camera, and
a time of flight (TOF) device for measuring a distance between the environment sensor and an object in the field of view based on propagation time of a polling signal from the TOF device to the object and back;
wherein an optical element for redirecting the field of view to the region is disposed in a light path between the region and the environment sensor,
wherein in at least one dimension the optical element has a variable curvature and/or focal length, and a first actuator for varying the curvature and/or focal length between at least one wide field of view state and one narrow field of view state is operatively connected to the controller
wherein in at least one dimension the optical element has a finite focal length and is displaceable between a position in the light path between the region and the environment sensor and a position offset from the light path, one of the two positions corresponding to the wide field of view state and the other to the narrow field of view state, and a second actuator for displacing the optical element is operatively connected to the controller.

7. The robotic system of claim 6, wherein the controller is adapted to control the field of view in the narrow field of view state to comprise a person or an end effector of a robotic arm.

8. The robotic system of claim 6, wherein the controller is configured to detect a person in an image from the camera in the wide field of view state, and, when a person is detected, to control the optical element to enter the narrow field of view state with the field of view at least partially covering the person.

9. The robotic system of claim 6, wherein the movable component is a robotic arm that is movable with respect to a base.

10. The robotic system of claim 9, wherein the environment sensor is disposed on the base.

11. The robotic system of claim 9, wherein the base comprises an upright post supporting the robotic arm, wherein the optical element is a mirror, and wherein the mirror is disposed between the environment sensor and the post.

12. The robotic system of claim 6, wherein the movable component is an automatically guided vehicle (AGV) and wherein the environment sensor is disposed on the AGV.

13. The robotic system of claim 6, wherein the optical element comprises a mirror.

14. The robotic system of claim 13, wherein the mirror is pivotably mounted and moveable by the second actuator.

15. The robotic system of claim 14, wherein the second actuator for pivoting the mirror is operatively connected to the controller.

* * * * *